United States Patent Office 2,912,262
Patented Nov. 10, 1959

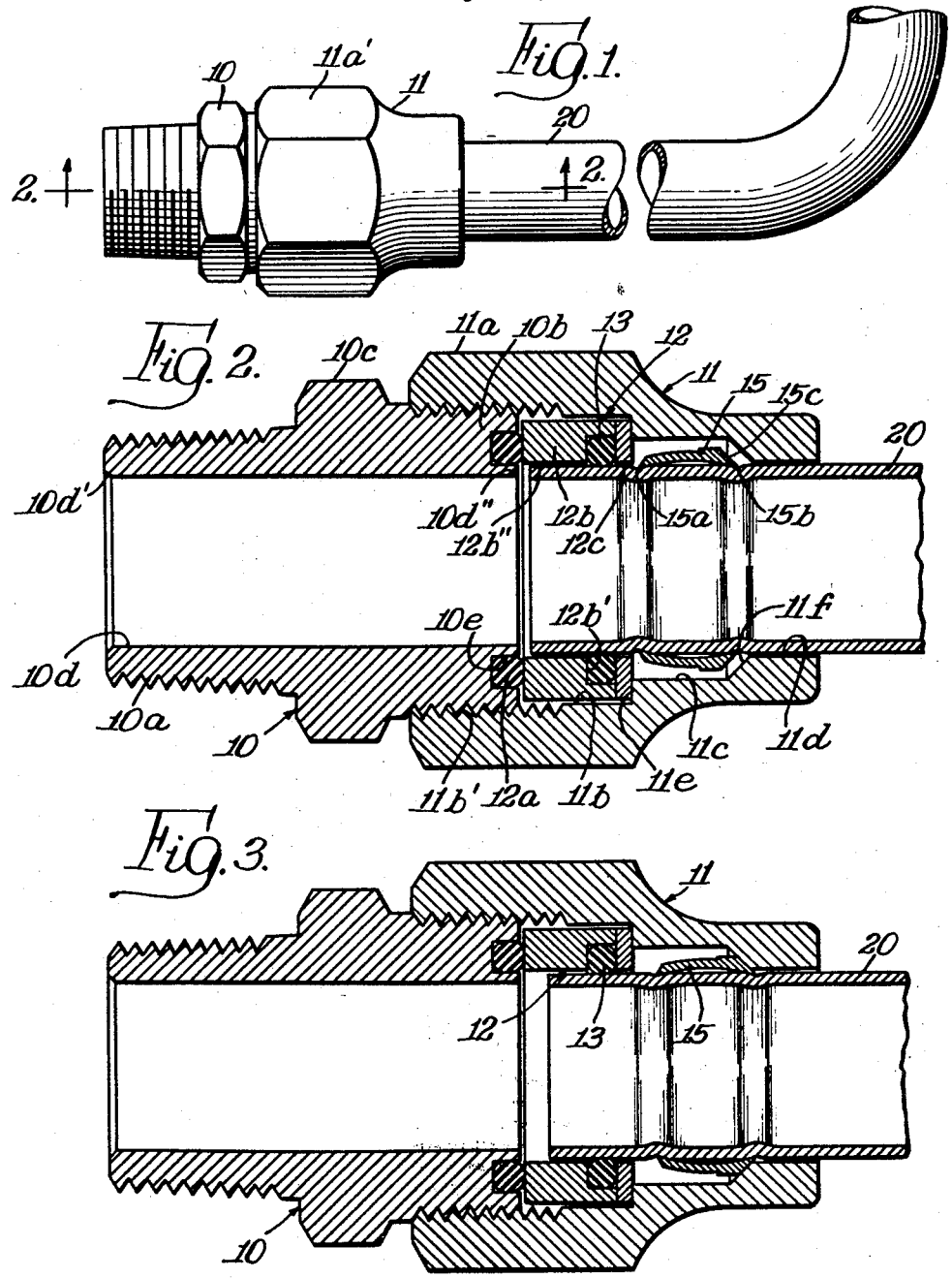

2,912,262

TUBE COUPLING ALLOWING LIMITED AXIAL MOVEMENT OF THE TUBE

George E. Franck, Riverside, Ill., assignor to The Imperial Brass Manufacturing Company, a corporation of Illinois Application April 4, 1955, Serial No. 499,055

1 Claim. (Cl. 285—231)

This invention relates to a coupling and in particular to a coupling accommodating both axial and radial play.

In connecting tubing to a device, it is often desirable to have a coupling which allows for some axial and radial play of the tubing relative to the device. Where the device is a relatively immovable object, such as an engine block, such flexibility in the coupling allows for a somewhat inaccurately aligned and positioned tube end to be effectively sealingly secured thereto, with resultant savings in assembly time and cost. Further, where intermittent high pressures are produced in the fluid within the tubing, strains are often produced on the tubing tending to move the tubing both radially and axially with resultant considerable stresses being produced in the coupling tending to destroy the sealed connection. Where the coupling is made extremely rigid and strong to preclude the destruction of the sealed connection, the tubing itself often fails under the stresses produced.

It is, therefore, the principal object of this invention to provide a new and improved coupling for connecting a tube to a device while allowing limited radial and axial play therebetween.

Another object is to provide a new and improved coupling allowing radial and axial play wherein the tube end is pivotally and slidably sealed to the body member of the coupling.

A further object is to provide a coupling as described above having means for positively limiting the radial and axial displacement of the tube which is simple and effective.

A yet further object is to provide a coupling having means for sealingly connecting a tube thereto while allowing axial and radial displacement thereof comprising an O-ring.

Other features and advantages of this invention will be apparent from the following description taken in connection with the accompanying drawings wherein:

Figure 1 is a side elevational view of a coupling embodying the invention and with the end of a tube, shown broken, secured thereto;

Figure 2 is a sectional view taken approximately along the line 2—2 of Figure 1 with the tube in the normal position; and Figure 3 is a sectional view similar to Figure 2 but with the tube in an extreme outer position.

In the exemplary embodiment disclosed in the drawings, the coupling comprises a body member 10 to which is sealingly secured, by means of a nut 11 cooperating with sealing means generally designated 12 and an annular sleeve 15, the end of a tube 20. To accommodate axial and radial displacement of the tube 20, the tube end is primarily supported by an annular sealing ring 13 which forms a part of the sealing means 12. Sleeve 15 is fixedly secured to the tubing at a distance from the end thereof and by having abutment with the sealing means 12 or the nut 11, serves to limit positively the longitudinal movement of the tube.

Body member 10 comprises a generally cylindrical member having an outer threaded end 10a arranged for cooperative mating engagement with a threaded port of the device to which the tube is to be connected (not shown). The opposite end 10b is exteriorly threaded and is separated from outer end 10a by an exterior annular boss 10c having a plurality of planar faces adapted for engagement by a tool as a wrench. Extending completely through the body member is a longitudinal bore 10d having an opening 10d' in body member outer end 10a and an opening 10d" in body member inner end 10b. Spaced from and surrounding bore opening 10d" in the inner end 10b is an annular groove 10e which is adapted to carry an O-ring 12a.

Nut 11 comprises a generally cylindrical member having an inner end 11a exteriorly provided with a plurality of planar surfaces 11a' adapted for engagement by a tool as a wrench. Extending completely through nut 11 is a stepped bore having an inner end 11b, a mid-portion 11c and an outer end 11d. Bore inner end 11b is threaded over a portion 11b' inwardly from the end of the bore opening in the nut end 11a and is adapted to receive the threaded end 10b of the body member 10. The diameter of bore mid-portion 11c is made somewhat less than the diameter of the end 11b, thus forming a shoulder 11e therebetween. The diameter of the bore outer end 11d is made somewhat smaller than the diameter of the mid-portion and a flared shoulder 11f is formed therebetween. The diameter of the bore outer end 11d is made somewhat greater than the external diameter of the tubing 20 to be connected to the coupling so that radial movement of the tube relative to the coupling may be accommodated.

Sealing means 12 comprises an annular block 12b received in bore inner end 11b and in fixed sealing abutment with the O-ring 12a carried in the body member groove 10e. The radially inner edge of the outer end of the block 12b is provided with a groove 12b' in which is carried an O-ring 13. To retain O-ring 13 in the groove 12b', an annular plate 12c is provided extending longitudinally between the outer end of the block 12b and nut shoulder 11e. Advancement of nut 11 toward end 10a of body member 10 causes abutment of shoulder 11e against plate 12c, and the pressing of the plate 12c against the black 12b to urge the block into tight sealing engagement with the O-ring 12a. O-ring 13 is provided with a diameter somewhat greater than the depth and width of groove 12b' so that it will be tightly held in the groove by action of plate 12c and will extend radially inwardly from the inner cylindrical surface 12b" of block 12b. When so compressed the internal diameter of O-ring 13 is slightly smaller than the external diameter of the tube 20 which is to be connected to the coupling. Clearance is provided between the tube 20 and each of block 12b, plate 12c and nut 11 so that the end of tube 20 is supported by O-ring 13 thereby allowing some radial displacement or angularity of tube 20 relative to the longitudinal axis of the coupling. Further, as the sealing engagement between O-ring 13 and the tube allows some sliding therebetween, longitudinal displacement may be had.

For purposes of limting the longitudinal movement of the tube 20 relative to the coupling, I provide a sleeve 15 comprising a deformable annular element having relatively sharp inner end edge 15a and outer end edge 15b. The outer end 15c is arranged to extend complementarily angularly to flared shoulder 11f of nut 11. With nut 11 placed on tube 20, sleeve 15 is fixedly secured to the tube as by forcibly pressing the sharp edges 15a and 15b into the wall of the tube adjacent the end of the tube. As best seen in Figure 2, the wall of tube 20 is depressed by the force of the edges acting thereagainst, thereby permanently locking the sleeve in assembled relationship thereon. The longitudinal length of sleeve 15 is made somewhat less than the longitudinal length of bore mid-portion 11c thereby allowing limited longitudinal movement of sleeve 15 between annular plate 12c and shoulder 11f. Abutment of the sleeve with either the plate 12c or shoulder 11f provides a positive limit to the longitudinal movement of the sleeve and, as the sleeve is fixedly secured to the tube 20, to the longitudinal movement of the tube relative to the coupling. The angular disposition of the flared shoulder 11f and the sleeve outer end 15c acts to press the outer edge 15b tightly against the tube more securely to retain the sleeve thereon.

Connection of a tube to a device is readily effected with my coupling. Body member 10 is threadedly secured to the device by engagement of its threaded end 10a with a threaded female port in the device. Nut 11 is placed over the end of the tube 20 and moved sufficiently away from the end of the tube to allow the fixed mounting of the sleeve 15 on the tube a short distance from the end thereof. Annular plate 12c is then placed on the tube and sealing block 12b having sealing ring 13 mounted in its groove 12b' is placed on the tube end with the sealing ring 13 abutting the plate 12c.

Nut 11 is then threadedly advanced onto body member 10 by engagement of threaded portion 11b' with the inner threaded end 10b of the body member 10. Advancement of the nut is continued until shoulder 11e abuts annular plate 12c forcing block 12b into tight sealing engagement with O-ring 12a and compressing sealing ring 13, causing ring 13 to expand radially inwardly into sealing engagement with the tube 20. The resultant inwardly projecting support of tube 20 by the sealing ring 13 allows angular and radial displacement and, as the tube 20 may slide relative to the ring 13, further allows longitudinal displacement. The longitudinal displacement is limited positively by the sleeve 15 having abutment with plate 12c or shoulder 11f. Angular and radial displacement is limited by abutment of tube 20 with the internal portions of the nut 11 and block 12b.

While I have shown and described certain embodiments of my invention, it is to be understood that it is capable of many modifications. Changes, therefore, in the construction and arrangement may be made without departing from the spirit and scope of the invention as defined in the appended claim.

I claim:

A coupling for a straight-ended tube and adapted for connecting the same to a device in a manner permitting limited axial movement of the tube while maintaining a sealed connection between the tube and a device comprising, in combination; a body member having a passage therethrough and at one end having means for connecting the body member in fluid conductive relationship with a device, an axially outwardly facing deformable sealing means mounted in an end wall at the other end of said body member; a nut threadedly secured to said other end of said body member and having a stepped bore therethrough, said bore having a first portion just large enough to receive freely therein a tube to be coupled, a second portion of enlarged diameter, a third portion of still further enlarged diameter, a first annular angularly disposed shoulder between said first and second portions, and a second annular radially disposed shoulder between said second and third portions; annular sealing means disposed in the said nut bore third portion comprising a rigid annular member having a bore therethrough and an external diameter larger than said nut bore second portion, the annular member having a groove in one end thereof and opening radially inward toward said tube and axially toward said second shoulder, a deformable annular sealing ring mounted in the groove, and an annular follower plate having one face thereof engaging the end of the rigid annular member and the deformable sealing ring and the other face engageable by said second shoulder to permit said annular member to be forced toward the end wall of the body member and thereby compress said sealing means, said annular member bore having an internal diameter less than said nut bore second portion and just large enough to receive freely therein the tube to be coupled, the deformable annular sealing ring protruding radially inwardly from said rigid member for sealingly engaging the periphery of the tube to be coupled; and a sleeve fixedly secured to the tube and spaced from an end thereof and fitting within said second bore portion, said sleeve having an angularly disposed surface at one end, said angular surface cooperating with the angularly disposed shoulder of the nut to limit outward movement of the tube, said sleeve being shorter than the distance between said first and second shoulders and having an external diameter larger than said nut bore first portion and larger than the internal diameter of said annular member.

References Cited in the file of this patent

UNITED STATES PATENTS

| | | |
|---|---|---|
| 2,394,351 | Wurzburger | Feb. 5, 1941 |
| 2,422,158 | Wolfram | June 10, 1947 |
| 2,466,526 | Wolfram | Apr. 5, 1949 |
| 2,469,851 | Stechey | May 10, 1949 |
| 2,479,711 | Arutunoff | Aug. 23, 1949 |
| 2,490,566 | Wishart | Dec. 6, 1949 |
| 2,533,097 | Dale | Dec. 5, 1950 |
| 2,631,049 | McGillis | Mar. 10, 1953 |
| 2,687,315 | Courtot | Aug. 24, 1954 |
| 2,781,207 | Detweiler | Feb. 12, 1957 |